United States Patent [19]

da Silva et al.

[11] Patent Number: 5,239,607
[45] Date of Patent: Aug. 24, 1993

[54] OPTICAL FIBER AMPLIFIER WITH FLATTENED GAIN

[75] Inventors: Valeria L. da Silva, Red Bank; Yaron Silberberg, West Windsor Township, Mercer County, both of N.J.

[73] Assignee: Bell Communications Research, Inc., Livingston, N.J.

[21] Appl. No.: 902,955

[22] Filed: Jun. 23, 1992

[51] Int. Cl.$^5$ .......................... H01S 3/30; G02B 6/26
[52] U.S. Cl. .................... 385/122; 385/142; 359/341; 359/342; 359/346; 359/347; 359/348; 359/349; 372/6; 372/94; 372/96; 372/703
[58] Field of Search .................. 385/42, 122, 142; 359/341, 342, 346, 347, 348, 349; 372/6, 94, 96, 703

[56] References Cited

U.S. PATENT DOCUMENTS

| 5,132,976 | 7/1992 | Chung et al. | 372/6 |
| 5,083,874 | 1/1992 | Aida et al. | 385/24 |
| 5,128,800 | 7/1992 | Zirngibl | 359/341 |
| 5,155,780 | 10/1992 | Zirngibl | 385/27 |

OTHER PUBLICATIONS

J. L. Zyskind et al., "Determination of Homogeneous Linewidth by Spectral Gain Hole-Burning in an Erbium-Doped Fiber Amplifier with GeO$_2$:SiO$_2$ Core," *IEEE Photonics Technology Letters*, 1990, vol. 2, pp. 869-871.
E. Desurvire et al., "Dynamic Gain Compensation in Saturated Erbium-Doped Fiber Amplifiers," *IEEE Photonics Technology Letters*, 1991, vol. 3, pp. 453-455.
E. Desurvire et al., "Study of Spectral Dependence of Gain Saturation and Effect of Inhomogeneous Broadening in Erbium-Doped Aluminosilicate Fiber Amplifiers," *IEEE Photonics Technology Letters*, 1990, vol. 2, pp. 653-655.
M. Zirngibl, "Gain control in erbium-doped fibre amplifiers by an all-optical feedback loop," *Electronics Letters*, 1991, vol. 27, pp. 560-561.
J. D. Moores, "Ultra-Long Distance Wavelength-Division-Multiplexed Soliton Transmission Using Inhomogeneously Broadened Fiber Amplifiers," *Journal of Lightwave Technology*, 1992, vol. 10, pp. 482-487.
M. Koga et al., "CWO$_4$ High-isolation polarization-insensitive optical circulator for advanced optical communication systems," Proceedings of the *Conference on Lasers and Electro-optics*, May 10-15, 1992, pp. 348-351, Anaheim, Calif.
H. Okamura, "Automatic optical-loss compensation with Er-doped fibre amplifier," *Electronics Letters*, vol. 27, Nov. 1991, pp. 2155-2156.

*Primary Examiner*—Frank Gonzalez
*Attorney, Agent, or Firm*—Leonard Charles Suchyta; Lionel N. White

[57] ABSTRACT

An apparatus and method for flattening the gain of an optical fiber amplifier (18) doped with an ion such as erbium and which is pumped by a pump laser (20). Optical couplers (32, 34) inserted before and after the fiber amplifier couple the main optical path to an optical ring passing through the fiber amplifier so as to form a ring laser. An optical isolator (32) placed in the ring causes the lasing light to only counterpropagate relative to the optical signal being amplified. When the fiber amplifier primarily exhibits inhomogeneous broadening and the ring lases, the lasing light clamps the gain to a value determined by the loop loss, and the value of the clamped gain is relatively uniform across a wide bandwidth.

12 Claims, 2 Drawing Sheets

OPTICAL FIBER AMPLIFIER WITH FLATTENED GAIN

FIELD OF THE INVENTION

The invention relates generally to optical amplifiers. In particular, the invention relates to optical fiber amplifiers having a flattened gain spectrum.

BACKGROUND ART

Optical fiber amplifiers have quickly found use in optical telecommunications networks, particularly those that rely on optical fibers to waveguide light over very long distances. Although modern silica optical fibers exhibit very low loss in the 1.3 and 1.5 μm windows, they are lossy to some extent and the loss accumulates over long distances. Optical fiber amplifiers allow the optical signal to be amplified without the need to convert the optical signal to an electrical signal and then regenerate the optical signal.

Erbium-doped fiber amplifiers, which are now well developed, amplify in a wavelength band between about 1.53 and 1.57 μm, well suited for silica fibers. However, even within this narrow bandwidth, erbium-doped amplifiers exhibit a distinct spectral variation in gain, as illustrated by gain spectrum 10 of FIG. 1. The lack of a flat gain spectrum over a wide bandwidth causes several problems. Extremely short optical pulses have a relatively wide power spectrum and are not accurately amplified if the gain spectrum is not flat. The lack of flat gain causes a lack of gain stability because the features of the gain spectrum depend upon factors, such as temperature and pumping levels, which are difficult to control.

Wavelength division multiplexing (WDM) is being developed to exploit the huge bandwidth of optical fiber without the need for extremely fast transmitters and detector. In WDM, the fiber receives data-modulated optical signals from several optical transmitters, each of which uses a different optical carrier frequency. With a channel spacing of 4 nm, a single erbium-doped fiber amplifier can simultaneously amplify about 10 WDM channels. However, if several amplifiers are cascaded, as would be required for a transoceanic cable, for example, the total gain spectrum of all the amplifiers becomes even less flat, and the optical carriers at the gain peaks may saturate while those on the skirts or valleys are insufficiently amplified. The same problem may occur in a broadcast system, where loss is due to splitting of the signal into many separate channels.

Past efforts to flatten the gain spectrum have mostly relied on passive or active filtering of the high-gain features of the gain spectrum, which requires close matching of the particular amplifier and filter and which must account for any temporal variation in the gain spectrum. Desurvire et al. has disclosed an electronic feedback control of the gain in "Dynamic Gain Compensation in Saturated Erbium-Doped Fiber Amplifiers", IEEE Photonics Technology Letters, volume 3, 1991, pp. 453-455. Their method stabilizes the gain and reduces crosstalk. Zirngibl has disclosed an all-optical version of the feedback control in "Gain control in erbium-doped fibre amplifiers by an all-optical feedback loop," Electronics Letters, volume 27, 1991, pp. 560-561. He sets up a ring laser through the amplifier that oscillates at a frequency out of the signal band. He describes the radiation in the feedback loop as traversing the amplifier in the same direction as the signal being amplified. Moores has developed the theory of saturating inhomogeneously broadened amplifiers for purposes of gain stabilization in "Ultra-Long Distance Wavelength-Division-Multiplexed Soliton Transmission Using Inhomogeneously Broadened Fiber Amplifiers," Journal of Lightwave Technology, volume 10, 1992, pp. 482-487.

SUMMARY OF THE INVENTION

The invention may be summarized as a method and apparatus for flattening the gain spectrum of a fiber amplifier. Optical couplers are inserted into the main optical path on either side of the fiber amplifier and are also connected to each other in a feedback loop so that the optical amplifier is also operating as a ring laser. An optical isolator is inserted into the feedback loop so as to pass only the laser signal rotating in the direction oppositely from that of the optical signal being amplified. The amplification gain is clamped at a value determined by the loss in the loop so that the width of the clamped and flat portion is also controlled by the loop loss.

DETAILED DESCRIPTION OF THE PREFERRED EMBODIMENTS

Figure 1:
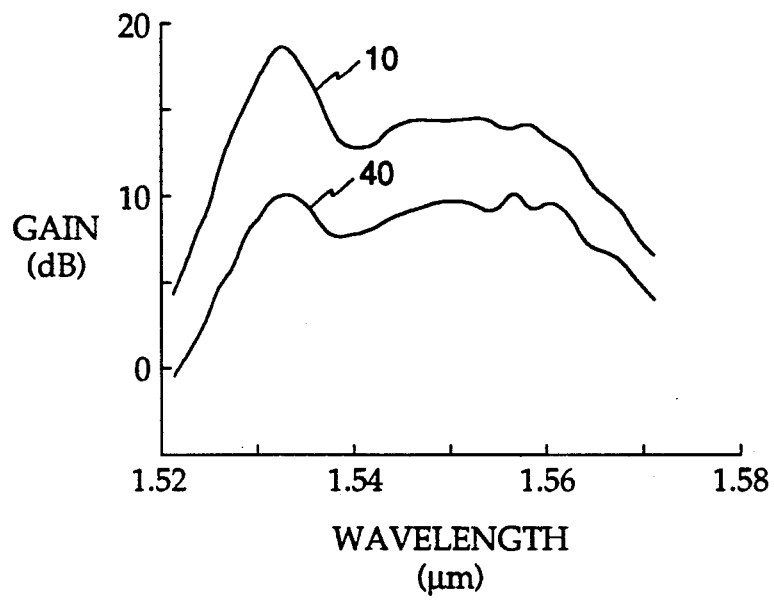
FIG. 1 is a graph of the gain spectra for fiber amplifiers of both the prior art and of the invention.
Figure 2:
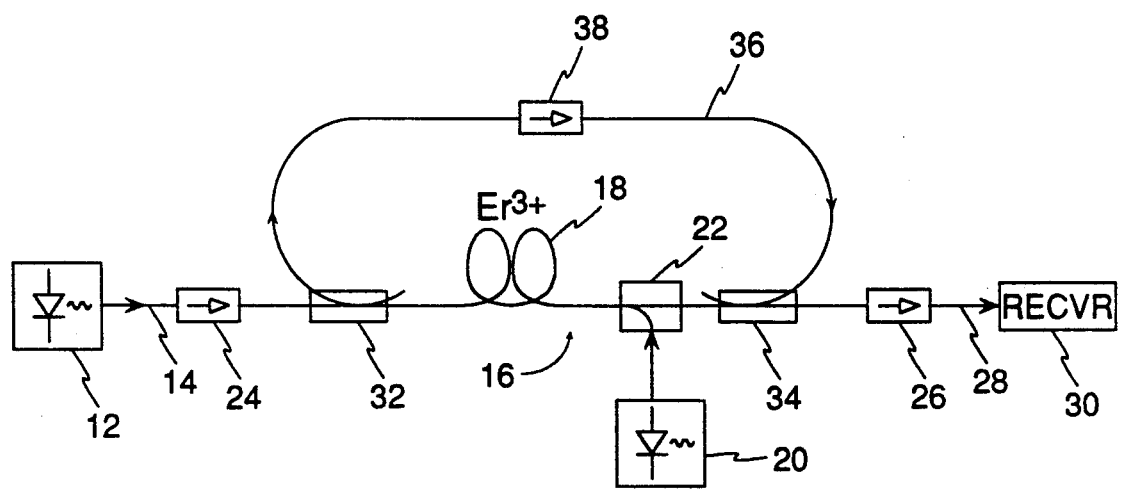
FIG. 2 is a schematic diagram of an embodiment of the fiber amplifier of the invention.

An embodiment of the fiber amplifier of the invention, illustrated in FIG. 2, includes several elements found in conventional fiber amplifiers. An optical transmitter 12 includes a semiconductor laser that emits at a set frequency around 1.5 μm and within the gain band of the amplifier. The laser is modulated by an electrical data signal. The data-modulated optical carrier is coupled into a silica transmission fiber 14. A fiber amplification stage 16 includes a section of erbium-doped silica fiber 18, a pump laser 20, and an optical combiner 22 which causes the pump radiation to traverse the erbium-doped fiber 18 in the direction opposite from that of the optical signal to be amplified. The erbium-doped fiber 18 is usually spliced on either end to passive, undoped silica fiber. An input isolator 24 and an output isolator 26 are positioned on either side of the amplification stage 16 to prevent an amplified signal from propagating back to the transmitter 12 and to prevent backwardly propagating noise from entering the amplification stage 16. One type of isolator relies on a Faraday polarization rotator placed between a pair of polarizers. The rotation angle is chosen so that light passes the isolator in one direction but is blocked in the other direction. The output of the amplification stage 16 is connected to another fiber 28 which supplies the amplified signal to a receiver 30, which may be immediately adjacent or several hundred kilometers away. Very long transmission paths may require several fiber amplifiers of the invention to be periodically spaced between the transmitter 12 and the receiver 30.

According to the invention, the erbium-doped fiber 18 is made to additionally be the active medium of a ring laser. Two optical couplers 32 and 34 are inserted in the main optical path connecting the transmitter 12 and the receiver 30. These couplers 32 and 34 are typically made by partially fusing together sections of two fibers. The degree and length of fusing determines the amount of light that is coupled from one fiber to the other. They are thus 2×2 reciprocal optical devices which are being used here for only three of their optical ports. Viewed from the side of the erbium-doped fiber 18, each of them transmits a large fraction, for example, 90% of the optical energy from that side to the port on the main optical path and transmits the remaining fraction to a feedback path including an optical fiber 36 and a third isolator 38. An optical loop is thereby formed that passes through the erbium-doped fiber 18 and the isolator 38. When the erbium-doped fiber 18 is pumped above the lasing threshold level, the loop forms a ring laser. The direction of the isolator 38 is chosen so that the ring laser creates an optical signal that counterpropagates relative to the optical signal being amplified. That is, the laser light and the optical signal pass through the erbium-doped fiber 18 in opposite directions. The input isolator 24 prevents the laser light from propagating back to the transmitter 12. The ring laser is expected to oscillate at one or more of the peaks of the gain curve since no frequency filtering is done in the feedback loop, and the laser frequency can be in the frequency band of the optical signal being amplified.

The action of the ring laser causes the gain spectrum of the fiber amplifier to flatten. The amount of flattening increases with the amount of loss introduced into the loop of the ring laser.

Erbium-doped fiber amplifiers rely on the incorporation of $Er^{3+}$ ions into sites within the glassy matrix of the fiber core. Pump light causes these ions to be excited to a series of higher-energy states where they oscillate between these states at a transition energy or frequency corresponding to the optical signal to be amplified. The gain spectrum depends on the transition energies of the excited ions. If all the ion sites were identical, the frequency would be a given frequency with a very narrow gain spectrum. However, various interactions, such as phonon scattering, cause the peak to broaden by what is referred to as homogeneous broadening. On the other hand, not all sites are equivalent, and the distribution of transition energies is referred to as inhomogeneous broadening.

The loop causes the gain to be clamped at L, where L is the round trip loss of the loop in dB. If the gain spectrum of the erbium-doped fiber is determined only by homogeneous broadening, the clamped value applies only to the peak of the original gain spectrum and the spectrum retains the same relative shape. On the other hand, if the gain spectrum is determined only by inhomogeneous broadening, the original gain spectrum is truncated at a uniform value of L. The bandwidth of the flat top of the truncated gain spectrum can be increased by decreasing the loop loss L so that more of the original peak is truncated, but decreasing the loss also reduces the amplifier gain. The gain spectrum 10 of the erbium-doped fiber amplifier is composed of several homogeneously broadened transitions, the relative strengths of which can vary. These transitions can be viewed as several homogeneous groups within a broader inhomogeneous line. As a result, with conventional doped fibers, the gain is flattened but the flattening is not complete.

The invention was experimentally verified. The erbium-doped fiber was a 30 m length of conventional doped fiber having an aluminosilicate core. The pump laser 20 emitted 30 mW at 1.48 μm. The optical combiner 22 was a dichroic coupler, Model WD1415F-M1, available from JDS Fitel of Nepean, Ontario. The loop isolator 32 was commercially obtained from AT&T Astrotec, Model 25B and had an insertion loss of 3 dB. The input coupler 32 was a wavelength independent coupler, Model 1270/1600-COS-10/90-0280x-04-7B, available from Gould Electronics of Glen Burnie, Maryland. The output coupler 34 was another wavelength independent coupler, Model 1270/1600-COS-50/50-02X02-04-7B. The input coupler 32 provided 90% coupling along the main optical path while the output coupler 34 provided 50%. The input isolator 24 was Model 81310LI, available from Hewlett-Packard, and the output isolator was Model IO-F-IR 2, available from Optics for Research of Caldwell, N.J. A tunable narrow band optical signal was delivered to the fiber amplifier, and the output of the amplifier was delivered to an optical spectrum analyzer, which generated a gain spectrum of the output signal relative to the input signal.

When the system was operated at room temperature, the round-trip loss of the loop was 18 dB and the loss in the signal channel was about 7 dB. When the feedback loop was opened so that no lasing occurred, gain spectrum 10 was observed, which is typical of conventional erbium-doped fiber amplifiers. However, when the feedback loop was closed, gain spectrum 40 was observed. Although the flattening was incomplete, it was substantially improved.

The system was also operated at 77° K. At this low temperature, the homogeneous broadening in the erbium-doped fiber was reduced so as to emphasize the inhomogeneous broadening. The lower temperature also increased the gain so that it was possible to operate with less feedback. Accordingly, the output coupler 34 was replaced with one like the input coupler 32 which coupled 90% of the power into the output fiber and increased the loop loss by 7 dB. The closing of the loop causes approximately the same reduction in gain seen at room temperature, but the flattening was substantially improved.

Figure 3:
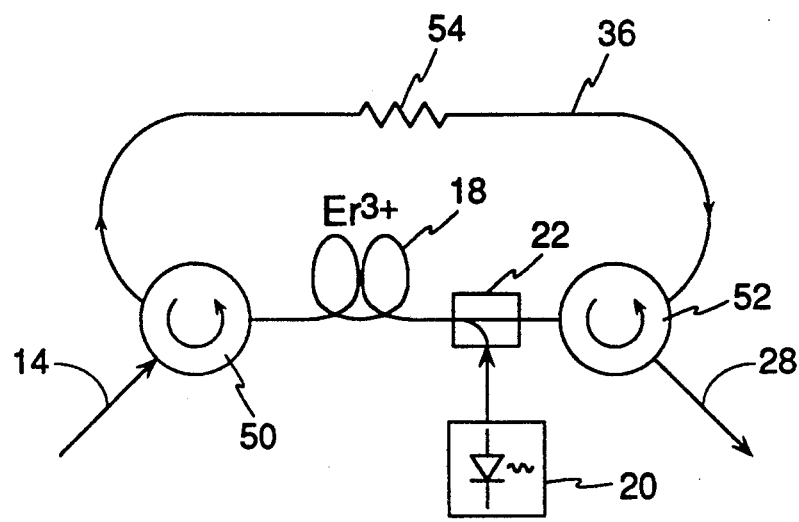
FIGS. 3 and 4 are schematic diagrams of alternate embodiments of the invention using optical circulators.
Figure 4:
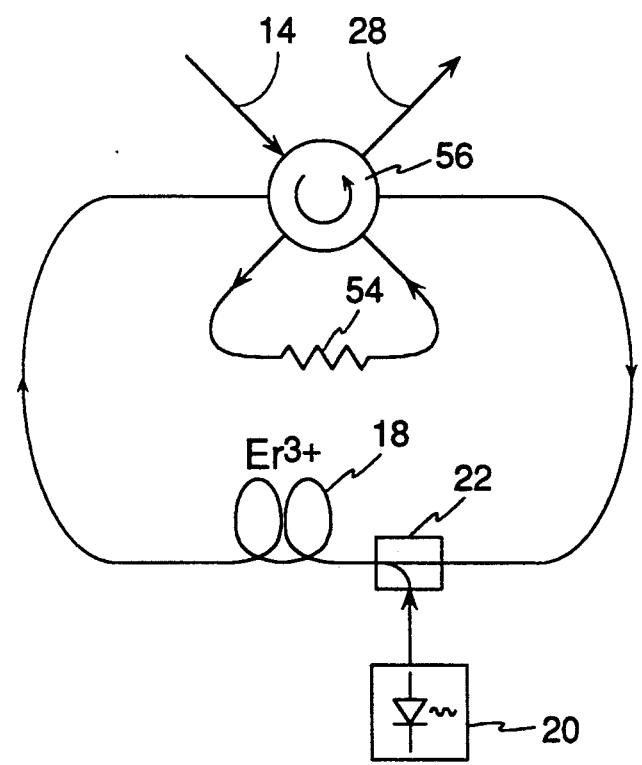

The invention may be alternatively implemented using optical circulators which selectively couple light between ports. Koga et al. has disclosed a type of optical circulator in "High-isolation polarization-insensitive optical circulator for advanced optical communication systems," *Conference on Lasers and Electro-optics*, 1992, pp. 348–351. In a three-port circulator, light input at the first port is output at the second port, light input at the second port is output at the third port, and light input at the third port is output at the first port. The embodiment illustrated in FIG. 3 uses two three-port circulators, which can be obtained by retro-reflecting one of Koga's four ports. An input circulator 50 guides the optical signal to be amplified from the input fiber 14 to the erbium-doped fiber 18. An output circulator 52 guides the amplified signal from the erbium-doped fiber 18 to the output fiber 28. Optical loss 54 is introduced in the feedback fiber 36 although the circulators may provide sufficient insertion loss to satisfy the required loop loss. The circulators 50 and 52 guide the counterpropagating laser light between the erbium-doped fiber 18 and the feedback fiber 36 and also present a path through the feedback fiber 36 for light propagating backwardly from the output fiber 28 to the input fiber 14. The same functionality can be achieved using a six-port circulator 56 with the connectivity illustrated in FIG. 4. A six-port circulator can be obtained by connecting two of Koga's four-port circulators through single respective ports. The circulators provide the functions of all the isolators of the embodiment of FIG. 2.

It is anticipated that erbium-doped germanosilicate ($GeO_2$:$SiO_2$) cores would provide performance superior to that of the conventional aluminosilicate cores described above because they are known to be more inhomogeneously broadened at room temperature. The difference between the materials is apparent by comparing "Study of Spectral Dependence of Gain Saturation and Effect of Inhomogeneous Broadening in Erbium-Doped Aluminosilicate Fiber Amplifiers," *IEEE Photonics Technology Letters*, volume 2, 1990, pp. 653-655 by Desurvire and "Determination of Homogeneous Linewidth by Spectral Gain Hole-Burning in an Erbium-Doped Fiber Amplifier with $GeO_2$:$SiO_2$ Core," ibid., pp. 869-871 by Zyskind et al.

Although erbium-doped silicate fibers have been described for the above examples, the same effect is expected with other types of fibers and dopants. Much work is underway to find a fiber amplifier at 1.3 μm. It is not necessary that the feedback isolator completely block the backwardly propagating light as long as that light is kept below the lasing threshold. The loss in the feedback can be controlled by a variable attenuator. Although a fiber was used in the feedback loop, more compact optical paths incorporating a substantial degree of directional preference can be achieved.

The invention flattens the gain of fiber amplifiers without the need for changing the fiber composition or for elaborate compensating schemes. Furthermore, the gain becomes nearly independent of the pumping power and of other factors and depends primarily upon the loop loss.

What is claimed is:

1. An optical fiber amplifier, comprising:
   an optical fiber doped with an excitable constituent and conveying in a first direction an optical signal to be amplified;
   a pump laser optically coupled to said optical fiber for irradiating said optical fiber with pump light to excite said constituent;
   an optical feedback channel connecting opposite ends of said doped optical fiber and forming part of an optical loop including said doped optical fiber; and
   an optical isolator included within said optical loop and oriented such that light preferentially passed by said isolator passes through said doped optical fiber opposite said first direction.

2. An optical fiber amplifier as recited in claim 1, wherein said feedback channel comprises a second optical fiber.

3. An optical fiber amplifier as recited in claim 2, further comprising:
   an input optical fiber;
   an output optical fiber;
   a first optical coupler having a first port connected to said input optical fiber, a second port connected to a first end of said second optical fiber, and a third port connected to a first end of said doped optical fiber; and
   a second optical coupler having a first port connected to said output optical fiber, a second port connected to a second end of said second optical fiber, and a third port connected to a second end of said doped optical fiber.

4. An optical fiber amplifier as recited in claim 1, wherein said doped optical fiber is doped with erbium.

5. An optical fiber amplifier as recited in claim 4, wherein said optical fiber comprises a germanosilicate core.

6. An optical fiber amplifier as recited in claim 1, wherein said doped optical fiber is selected to exhibit inhomogeneous broadening.

7. An optical fiber amplifier as recited in claim 1, wherein said isolator is included within said feedback channel.

8. An optical fiber amplifier system, comprising:
   an optical fiber amplifier amplifying an optical signal passing therethrough in a first direction from a first side to a second side thereof;
   first coupling means disposed on said first side of said optical fiber amplifier for coupling light passing through said fiber amplifier in a second direction opposite to said first direction to a first optical path;
   second coupling means disposed on said second side of said optical fiber amplifier for coupling light from a second optical path into said fiber amplifier in said second direction; and
   preferential coupling means optically connecting said first and second optical paths on respective ends thereof away from said first and second coupling means for coupling light from said first optical path to said second optical path preferentially over light from said second optical path to said first optical path.

9. A system as recited in claim 8, wherein said first coupling means further couples said optical signal from an input channel to said optical fiber amplifier, wherein said second coupling means further couples said amplified optical signal from said optical fiber amplifier to an output channel, and wherein said fiber amplifier, said first, second, and preferential coupling means form a ring for lasing in only a single direction around said ring.

10. A system as recited in claim 9, wherein said ring lases at a frequency within a bandwidth of said optical signal.

11. A method of flattening the gain of an optical fiber amplifier amplifying a signal passing along a principal optical path and extending through an active medium of said amplifier in a first direction, comprising the steps of:
   creating an optical loop including a portion of said principal optical path passing through said active medium and a feedback path outside of said principal optical path; and
   preferentially decreasing within said feedback path light propagating around said optical loop in said first direction within said active medium relative to light propagating around said optical loop opposite said first direction within said active medium.

12. A method as recited in claim 11, wherein said creating step comprises partially coupling said feedback path to two portions of said principal optical path on opposite sides of said active medium.

* * * * *